(12) United States Patent
Ronk et al.

(10) Patent No.: US 7,506,740 B2
(45) Date of Patent: *Mar. 24, 2009

(54) POWER TRANSMISSION DEVICE WITH CLUTCH CONTROL SYSTEM

(75) Inventors: Aaron Ronk, Lake George, NY (US); John D. Zalewski, Liverpool, NY (US); James S. Brissenden, Baldwinsville, NY (US)

(73) Assignee: Magna Powertrain USA, Inc., Troy, MI (US)

( * ) Notice: Subject to any disclaimer, the term of this patent is extended or adjusted under 35 U.S.C. 154(b) by 366 days.

This patent is subject to a terminal disclaimer.

(21) Appl. No.: 11/476,332

(22) Filed: Jun. 28, 2006

(65) Prior Publication Data

US 2006/0278493 A1    Dec. 14, 2006

Related U.S. Application Data

(63) Continuation-in-part of application No. 10/931,590, filed on Sep. 1, 2004, now Pat. No. 7,097,019.

(51) Int. Cl.
*F16D 29/00*    (2006.01)
*F16D 25/12*    (2006.01)

(52) U.S. Cl. .............. 192/84.91; 60/545; 180/233; 192/84.93; 192/85 R; 192/85 AA

(58) Field of Classification Search ............... None
See application file for complete search history.

(56) References Cited

U.S. PATENT DOCUMENTS

| | | | |
|---|---|---|---|
| 4,862,769 A | 9/1989 | Koga et al. | |
| 4,895,236 A | 1/1990 | Sakakibara et al. | |
| 5,224,906 A | 7/1993 | Sturm | |
| 5,323,871 A | 6/1994 | Wilson et al. | |
| 5,332,060 A | 7/1994 | Sperduti et al. | |
| 5,407,024 A | 4/1995 | Watson et al. | |
| 6,145,644 A | 11/2000 | Mohan et al. | |
| 6,354,977 B1 | 3/2002 | Brown et al. | |
| 6,446,774 B2 | 9/2002 | Porter | |
| 6,484,857 B2 | 11/2002 | Vonnegut et al. | |
| 6,578,654 B2 | 6/2003 | Porter | |
| 6,595,338 B2 | 7/2003 | Bansbach et al. | |
| 6,612,957 B2 | 9/2003 | Bansbach et al. | |
| 6,655,138 B2 | 12/2003 | Shaw et al. | |
| 6,679,565 B2 | 1/2004 | Riddiford | |

(Continued)

FOREIGN PATENT DOCUMENTS

FR    2 566 492 A1    12/1985

(Continued)

*Primary Examiner*—Rodney H Bonck
(74) *Attorney, Agent, or Firm*—Harness, Dickey & Pierce, P.L.C.

(57) ABSTRACT

A power transmission device includes a rotary input member receiving drive torque from a source of torque, a rotary output member for providing drive torque to an output device and a torque transfer mechanism for transferring drive torque between the input member and the output member. The torque transfer mechanism includes a friction clutch assembly operably disposed between the input member and the output member and a hydraulic clutch actuation system operable for applying a clutch engagement force to the friction clutch assembly. The hydraulic clutch actuation system includes an electromagnet and a piston operable to supply pressurized fluid and provide the clutch engagement force.

18 Claims, 13 Drawing Sheets

U.S. PATENT DOCUMENTS

| | | |
|---|---|---|
| 6,725,990 B2 | 4/2004 | Bowen |
| 6,745,879 B1 | 6/2004 | Dolan |
| 7,097,019 B2 * | 8/2006 | Ronk et al. ............... 192/85 C |
| 2003/0221930 A1 * | 12/2003 | Steinel et al. ........... 192/85 CA |
| 2005/0023102 A1 | 2/2005 | Brissenden et al. |
| 2005/0121283 A1 | 6/2005 | Brissenden et al. |

FOREIGN PATENT DOCUMENTS

| | | |
|---|---|---|
| GB | 2 211 577 A | 7/1989 |
| JP | 2-18117 | 1/1990 |
| JP | 3066927 | 3/1991 |

* cited by examiner

POWER TRANSMISSION DEVICE WITH CLUTCH CONTROL SYSTEM

CROSS-REFERENCE TO RELATED APPLICATIONS

This application is a continuation-in-part of U.S. patent application Ser. No. 10/931,590 filed on Sep. 1, 2004, now issued as U.S. Pat. No. 7,097,019.

FIELD OF THE INVENTION

The present invention relates generally to power transfer systems operable for controlling the distribution of drive torque between a pair of rotary shafts and, more particularly, to clutch control systems operable to efficiently convert electrical energy to mechanical potential energy for subsequent actuation of a clutch.

BACKGROUND OF THE INVENTION

In view of increased consumer demand for four-wheel drive vehicles, a plethora of power transfer systems are currently being utilized in vehicular driveline applications for selectively directing power (i.e., drive torque) to the non-driven wheels of the vehicle. In many power transfer systems, a part-time transfer case is incorporated into the driveline and is normally operable in a two-wheel drive mode for delivering drive torque to the driven wheels. A mechanical mode shift mechanism can be selectively actuated by the vehicle operator for rigidly coupling the non-driven wheel to the driven wheels in order to establish a part-time four-wheel drive mode. As will be appreciated, a motor vehicle equipped with a part-time transfer case offers the vehicle operator the option of selectively shifting between the two-wheel drive mode during normal road conditions and the part-time four-wheel drive mode for operation under adverse road conditions.

Alternatively, it is known to use "on-demand" power transfer systems for automatically directing power to the non-driven wheels, without any input or action on the part of the vehicle operator, when traction is lost at the driven wheels. Modernly, it is known to incorporate the on-demand feature into a transfer case by replacing the mechanically-actuated mode shift mechanism with a clutch assembly that is interactively associated with an electronic control system and a sensor arrangement. During normal road conditions, the clutch assembly is maintained in a non-actuated condition such that the drive torque is only delivered to the driven wheels. However, when the sensors detect a low traction condition at the driven wheels, the clutch assembly is automatically actuated to deliver drive torque "on-demand" to the non-driven wheels. Moreover, the amount of drive torque transferred through the clutch assembly to the normally non-driven wheels can be varied as a function of specific vehicle dynamics, as detected by the sensor arrangement.

Conventional clutch assemblies typically include a clutch pack operably connected between a drive member and a driven member. A power-operated actuator controls engagement of the clutch pack. Specifically, torque is transferred from the drive member to the driven member by actuating the power-operated actuator. The power-operated actuator displaces an apply plate which acts on the clutch pack and increases the frictional engagement between the interleaved plates.

A variety of power-operated actuators have been used in the art. Exemplary embodiments include those disclosed in U.S. Pat. No. 5,407,024 wherein a ball-ramp arrangement is used to displace the apply plate when a current is provided to an induction motor. Another example disclosed in U.S. Pat. No. 5,332,060, assigned to the assignee of the present application, includes a linear actuator that pivots a lever arm to regulate the frictional forces applied to the clutch pack. These types of systems are often equipped with motors that may require peak electrical currents greater than optimally desired to operate the clutch actuators. While the above actuator devices may perform adequately for their intended purpose, a need exists for an improved clutch actuation system that requires a relatively low, minimally fluctuating supply of electrical power for operation.

SUMMARY OF THE INVENTION

A power transmission device includes a rotary input member receiving drive torque from a source of torque, a rotary output member for providing drive torque to an output device and a torque transfer mechanism for transferring drive torque between the input member and the output member. The torque transfer mechanism includes a friction clutch assembly operably disposed between the input member and the output member and a hydraulic clutch actuation system operable for applying a clutch engagement force to the friction clutch assembly. The hydraulic clutch actuation system includes an electromagnet drivingly coupled to a hydraulic actuator. The hydraulic actuator includes a first piston slidably positioned within a housing and operable to supply pressurized fluid to a second piston. Supply of pressurized fluid to the second piston provides the clutch engagement force.

BRIEF DESCRIPTION OF THE DRAWINGS

The present invention will become more fully understood from the detailed description given below, the appended claims, and the accompanying drawings in which:

DETAILED DESCRIPTION OF THE PREFERRED EMBODIMENT

In general, the present invention is directed to a power transfer system which is operably installed between the driven and non-driven wheels of a four-wheel drive vehicle. In operation, the amount of drive torque transferred to the non-driven wheels is controllably regulated in accordance with various system and driver-initiated inputs for optimizing the tractive characteristics of the vehicle. In addition, the power transfer system may also include a mode select mechanism for permitting a vehicle operator to select between a two-drive wheel mode, a part-time four-wheel drive mode, and an "on-demand" drive mode. The power transfer system of the present invention includes a clutch control system for converting electrical energy to mechanical potential energy to alleviate exceedingly high peak electrical current requirements that may occur during vehicle operation.

Figure 1:
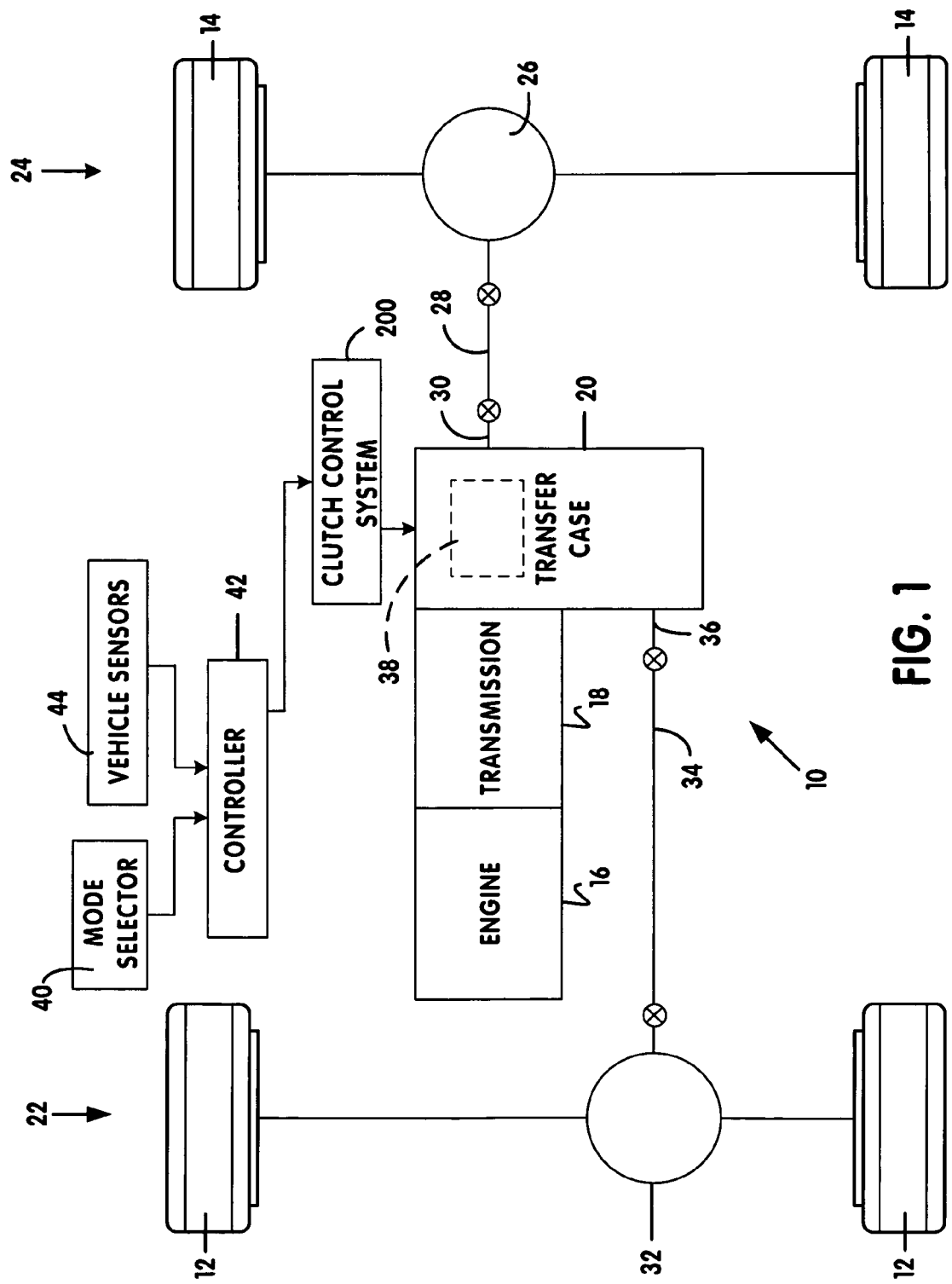
FIG. 1 is a schematic representation of an exemplary four-wheel drive vehicle having a power transmission device equipped with a torque transfer clutch and the clutch control systems of the present invention incorporated therein.

Referring to FIG. 1 of the drawings, a drivetrain for a four-wheel drive vehicle is schematically shown interactively associated with a power transfer system 10. The motor vehicle drivetrain has a pair of front wheels 12 and rear wheels 14 both drivable from a source of power, such as an engine 16, through a transmission 18 which may be of either the manual or automatic type. In the particular embodiment shown, the drivetrain is a rear wheel drive system which incorporates a power transmission device, hereinafter referred to as transfer case 20, that is operable to receive drive torque from engine 16 and transmission 18 for normally driving rear wheels 14 (i.e., the "driven" wheels) in a two-wheel drive mode of operation. Front wheels 12 and rear wheels 14 are shown connected at opposite ends of front and rear axle assemblies 22 and 24, respectively. As is known, a rear differential 26 is interconnected between rear axle assembly 24 and one end of a rear drive shaft 28, the opposite end of which is interconnected to a first output shaft 30 of transfer case 20. Similarly, front axle assembly 22 includes a front differential 32 that is coupled to one end of a front drive shaft 34, the opposite end of which is coupled to a second output shaft 36 of transfer case 20. It is to be understood that the specific orientation of the drivetrain is merely exemplary in nature and that the drivetrain could be reversed for normally driving front wheels 12.

Transfer case 20 is equipped with a torque transfer clutch 38 for selectively delivering drive torque to front wheels 12 (i.e., the non-driven wheels) to establish a four-wheel drive mode of operation. The operating mode of transfer clutch 38 is generally controlled in response to a mode signal generated by a mode selector 40 and which is sent to a controller 42. Controller 42 also receives input signals from one or more vehicle sensors 44 that are indicative of various operational characteristic of the vehicle.

When the two-wheel drive mode is selected, all drive torque is delivered from first output shaft 30 to rear wheels 14 and transfer clutch 38 is maintained in a "non-actuated" condition. When the part-time four-wheel drive mode is selected, transfer clutch 38 is fully actuated and maintained in a "lock-up" condition such that second output shaft 36 is, in effect, rigidly coupled for driven rotation with first output shaft 30. When the "on-demand" drive mode is selected, controller 42 communicates with a clutch control system 200 to control the degree of actuation of transfer clutch 38 for varying the amount of drive torque directed to front wheels 12 through transfer clutch 38 as a function of the sensor input signals for providing improved tractive performance when needed. In addition, controller 42 is adapted to controllably modulate the actuated state of transfer clutch 38 as described in greater detail hereinafter. By way of example rather than limitation, the control scheme generally disclosed in U.S. Pat. No. 5,332,060 issued Jul. 26, 1994 to Sperduti et al. and assigned to the common assignee of the present invention (the disclosure of which is hereby incorporated by reference) can be used to control adaptive actuation of transfer clutch 38 during on-demand operation.

Figure 2:
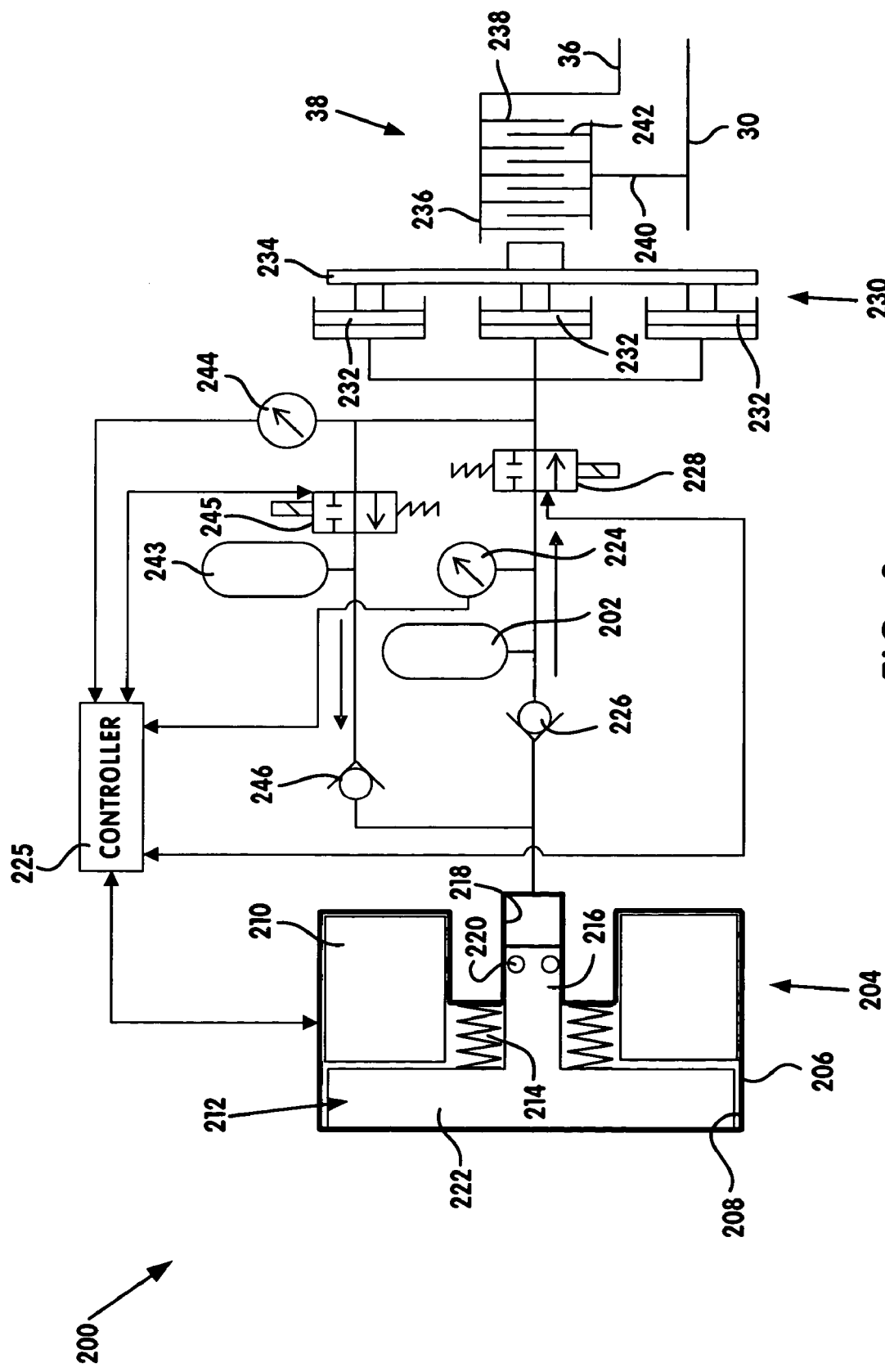
FIG. 2 is a schematic representation of a clutch control system according to a first embodiment of the present invention.
Figure 3:
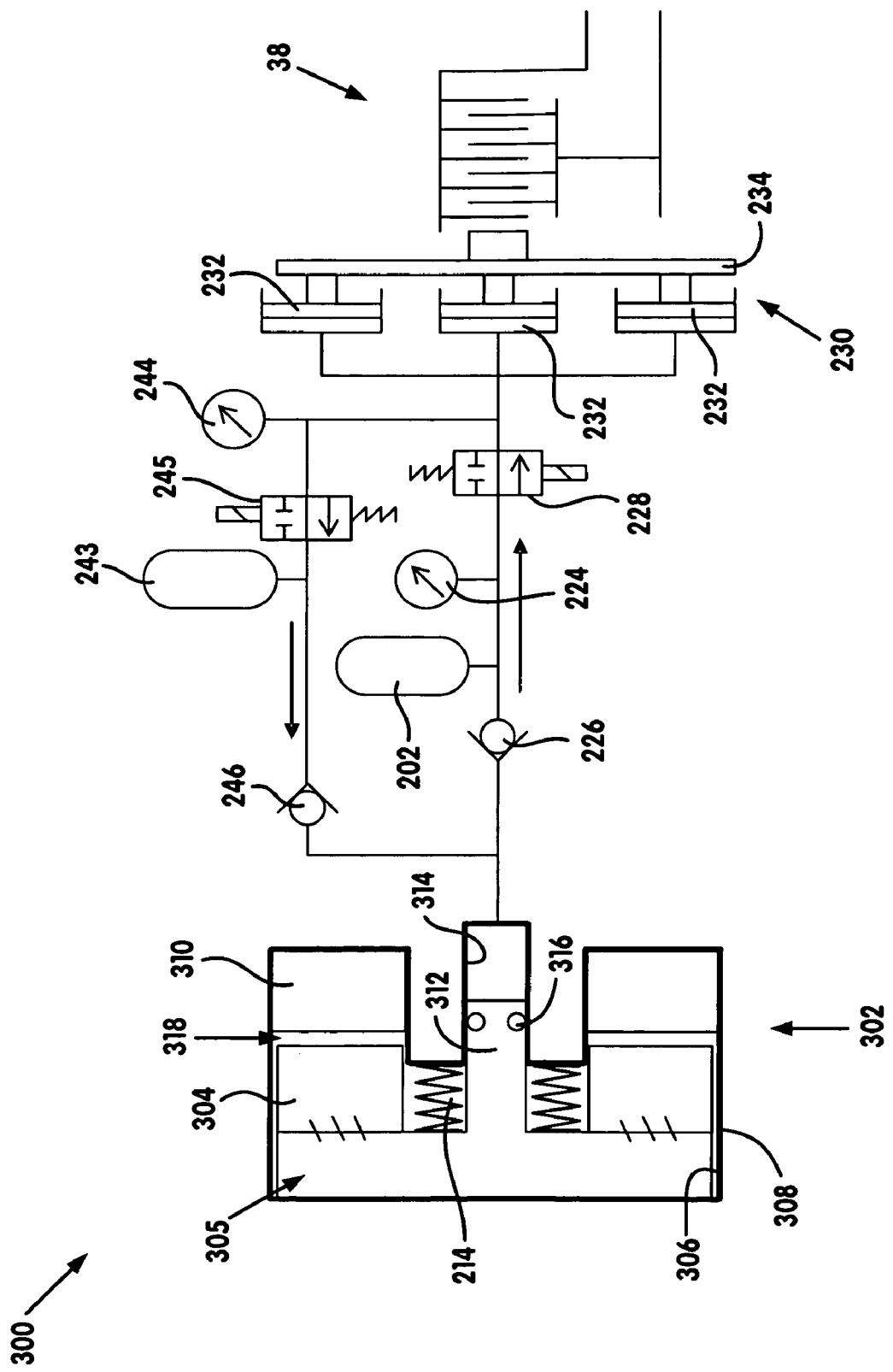
FIG. 3 is a schematic representation of a clutch control system according to an alternative embodiment of the present invention.
Figure 4:
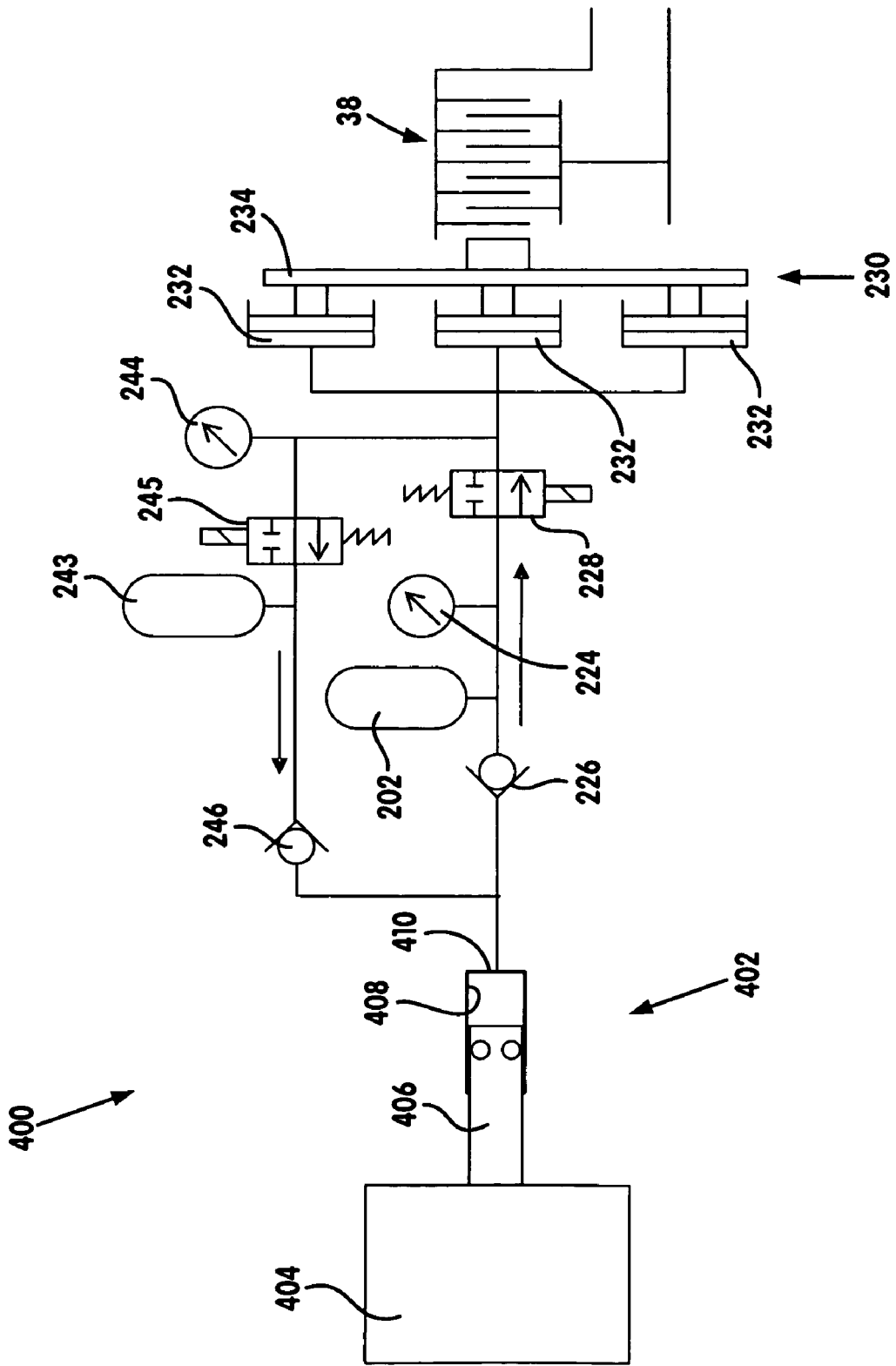
FIG. 4 is a schematic representation of a clutch control system according to yet another alternative embodiment of the present invention.

FIGS. 2-4 depict various clutch control systems for storing mechanical energy and reducing the maximum required electrical current for clutch actuation. The clutch control systems discussed below are an improvement over prior systems due to their ability to reduce peak power draw and overall power consumption from the vehicle's electrical system while operating the modulating clutch. The decrease in power draw is primarily accomplished by using a relatively low amount of electrical energy over time to charge a mechanical energy storage device and releasing the energy rapidly when required. This control scheme makes it possible to reduce the size of vehicle electrical system including the wires and circuitry controlling the electrical system. Each of the clutch control systems described below provides for operating a modulating clutch or clutches. The controls for the modulating clutches utilize available vehicle information along with hydraulic system information to react to a vehicle command for providing the required torque transfer and/or speed limiting function.

The first exemplary embodiment clutch control system 200 is depicted in FIG. 2. Clutch control system 200 includes an accumulator 202 as an energy storage device. Accumulator 202 may be of the gas or spring type. Clutch control system 200 also includes a hydraulic actuator 204 in communication with accumulator 202. Hydraulic actuator 204 is operable to provide intermittent pulses of highly pressurized fluid to accumulator 202 to store mechanical potential energy in the accumulator.

Hydraulic actuator 204 includes a housing 206 defining a cavity 208, an electromagnet 210 and a master piston 212 slidably positioned within cavity 208 of housing 206. Electromagnet 210 is positioned within housing 206. A spring 214 interconnects master piston 212 and housing 206 to biasedly urge master piston 212 toward a retracted position shown in FIG. 2.

Master piston 212 includes a stem portion 216 slidably positioned within a hydraulic cavity 218 formed within housing 206. A seal 220 sealingly engages stem portion 216 and housing 206 to allow a relatively high pressure to be generated within hydraulic cavity 218. Master piston 212 is preferably constructed from a magnetizable material such that energization of electromagnet 210 attracts a body portion 222 of master piston 212 toward electromagnet 210.

Hydraulic actuator 204 may be operated as a pump by alternately supplying and disconnecting power to electromagnet 210. When the electromagnet is powered, body portion 222 of master piston 212 is attracted toward electromagnet 210. When body portion 222 contacts electromagnet 210, piston 212 is in the advanced position. During this operation, stem portion 216 axially translates in an advancing direction to supply pressurized fluid to accumulator 202. Once body portion 222 contacts electromagnet 210, power is discontinued to the electromagnet. Spring 214 forces master piston 212 toward the retracted position shown in FIG. 2.

Clutch control system 200 also includes a first pressure sensor 224 in communication with accumulator 202. First pressure sensor 224 is operable to provide a signal indicative of the fluid pressure within accumulator 202 to a controller 225. It should be appreciated that controller 225 may be a stand alone unit or may be incorporated as part of controller 42. A non-returning check valve 226 is plumbed between cavity 218 and accumulator 202 to allow pressurized fluid to enter the accumulator but restrict flow from the accumulator toward the pressurized fluid source. A first control valve 228 is operable to selectively supply pressurized fluid within accumulator 202 to a clutch actuator assembly 230. Depending on system requirements, first control valve 228 may be a variable force solenoid, a pulse width modulation control valve, a proportional flow control valve or a proportional pressure control valve. Clutch actuator assembly 230 includes a plurality of slave pistons 232 substantially circumferentially spaced apart from one another and in communication with an apply plate 234. Apply plate 234 is axially moveable and operable to transmit a clutch engagement force to transfer clutch 38.

Transfer clutch 38 is a multi-plate clutch assembly that is arranged to transfer torque between first output shaft 30 and second output shaft 36. Transfer clutch 38 includes a cylindrical drum 236 shown to be operably fixed for rotation with second output shaft 36 and having a plurality of first or outer clutch plates 238 mounted (i.e., splined) for rotation with drum 236. A clutch hub 240 of transfer clutch 38 is fixed for rotation with first output shaft 30. A second set of clutch plates 242, referred to as inner clutch plates, are mounted (i.e., splined) for rotation with clutch hub 240. Torque is transferred between first output shaft 30 and second output shaft 36 by frictionally engaging first clutch plates 238 with second clutch plates 242 with a compression force supplied by apply plate 234.

Slave pistons 232 are slidably engageable with apply plate 234 and transmit a force proportional to the pressure acting on each of slave pistons 232. A second pressure sensor 244 is plumbed in communication with slave pistons 232. Second pressure sensor 244 is operable to output a signal indicative of the fluid pressure acting on slave pistons 232. The signal is provided to controller 225 and used as a feedback signal to control the torque generated by transfer clutch 38. A second control valve 245 is operable to selectively supply pressurized fluid acting on slave pistons 232 to a second accumulator 243. Second accumulator 243 contains fluid at a substantially lower pressure than accumulator 202. Pressure acting on slave pistons 232 may be selectively released to second accumulator 223 by actuating second control valve 245.

An optional second non-returning check valve 246 acts as a pressure relief valve to allow fluid previously acting on slave pistons 232 to return to cavity 218. One skilled in the art will appreciate that clutch control system 200 is a closed hydraulic system. Accordingly, fluid need not be continually supplied to clutch control system 200 once the system has been initially filled with hydraulic fluid. An account for fluid leakage may be made as will be described.

In operation, clutch control system 200 operates to charge accumulator 202 with fluid at a relatively high pressure by operating hydraulic actuator 204 and energizing electromagnet 210 to translate stem portion 216 in an advancing direction. Electromagnet 210 generates enough force to overcome the force generated by spring 214 and pressurize fluid within cavity 218. Pressurized fluid passes through non-returning check valve 226 and enters accumulator 202. During the accumulator charging cycle, first control valve 228 is closed. If clutch control system 200 is not equipped with a second non-returning check valve, second control valve 245 is also maintained in the closed position to charge accumulator 202.

Once master piston 212 is in the advanced position, the power supply to electromagnet 210 is discontinued. Spring 214 forces master piston 212 to the retracted position. The pumping or charging sequence is continued until a desired pressure within accumulator 202 is reached as indicated by a signal output from first pressure sensor 224. It should be appreciated that hydraulic actuator 204 may produce a maximum desired pressure while requiring minimal current from the vehicle power source.

Once the desired pressure is stored in accumulator 202 the charging cycle is discontinued. At this time, clutch control system 200 awaits a torque demand signal. Upon receipt of a signal for torque from controller 225, first control valve 228 is opened to supply pressurized fluid to slave pistons 232. The signal output from second pressure sensor 244 indicates the pressure acting upon slave pistons 232 and may be correlated to torque generated by transfer clutch 38. If a reduction in output torque from transfer clutch 38 is desired, second control valve 245 is allowed to shift to its normally open position thereby releasing pressurized fluid into low pressure accumulator 243 and reduce the pressure acting upon slave pistons 232.

In an alternate form, clutch control system 200 may be equipped with an alternate second control valve (not shown) that operates as a normally closed valve as opposed to the normally open configuration shown in FIG. 2. If second control valve 245 is a normally closed valve, leakage of fluid past first control valve 228 may cause transfer clutch 38 to be in an applied condition during vehicle inoperative times. Some Original Equipment Manufacturers may not wish this condition and specify the normally open second control valve. Furthermore, any number of the valves presently depicted may be plumbed as normally or normally closed valves to meet vehicle manufacturer requirements.

FIG. 3 depicts an alternate embodiment clutch control system 300. Clutch control system 300 is a closed system similar to the clutch control system previously discussed. Like elements will retain the reference numerals previously introduced. Clutch control system 300 includes an actuator 302 that functions substantially similarly to hydraulic actuator 204. However, actuator 302 includes a first magnet 304 coupled to a master piston 305. The first electromagnet and master piston subassembly is slidably positioned within a cavity 306 of a housing 308. A second electromagnet 310 is also positioned within cavity 306. Second electromagnet 310 is fixed to housing 308. Master piston 305 includes a stem portion 312 operably acting on hydraulic fluid contained within a hydraulic cavity 314 of housing 308. A seal 316 sealingly engages stem portion 312 and cavity 314 to maintain a closed hydraulic system.

A gap 318 exists between first electromagnet 304 and second electromagnet 310 when master piston 305 is in the retracted position as shown in FIG. 3. As mentioned earlier, spring 214 urges master piston 305 toward the retracted position. When the first and second electromagnets are energized, the first electromagnet and master piston subassembly is attracted to second electromagnet 310. During this operation, stem portion 312 forces pressurized hydraulic fluid past non-returning check valve 226 into accumulator 202. When first electromagnet 304 contacts second electromagnet 310, the first electromagnet master piston subassembly is in the advanced position. Power is discontinued to each of the electromagnets and spring 214 forces master piston 305 back to the retracted position once again. In this manner, actuator 302 may act as a pump to provide pressurized fluid to accumulator 202. It should be appreciated that the remaining components of clutch control system 300 and their operation are substantially similar to the components previously described in relation to clutch control system 200. Accordingly, a redundant description will not be provided.

FIG. 4 depicts an alternate embodiment clutch control system 400 operable for selectively supplying an actuation force to transfer clutch 38. Clutch control system 400 is substantially similar to clutch control system 300 previously described. For clarity, like elements will retain their previously introduced reference numerals.

Clutch control system 400 includes an actuator 402 that functions substantially similarly to hydraulic actuators 204 and 302 previously described. However, actuator 402 includes a spring return solenoid 404 coupled to a master piston 406. Master piston 406 is slidably positioned within a cavity 408 of a housing 410. Solenoid 404 includes a return spring (not shown) operable to return master piston 406 to a retracted position as depicted in FIG. 4. Energization of solenoid 404 causes master piston 406 to translate in an advancing direction. As master piston 406 translates, pressurized fluid is supplied to accumulator 202. At the end of the stroke of master piston 406, power is no longer supplied to solenoid 404 and the internal return spring retracts master piston 406. This sequence of events is repeated to pump highly pressurized fluid into accumulator 202. Other components of clutch control system 400 function substantially similarly to those previously described.

Figure 5:
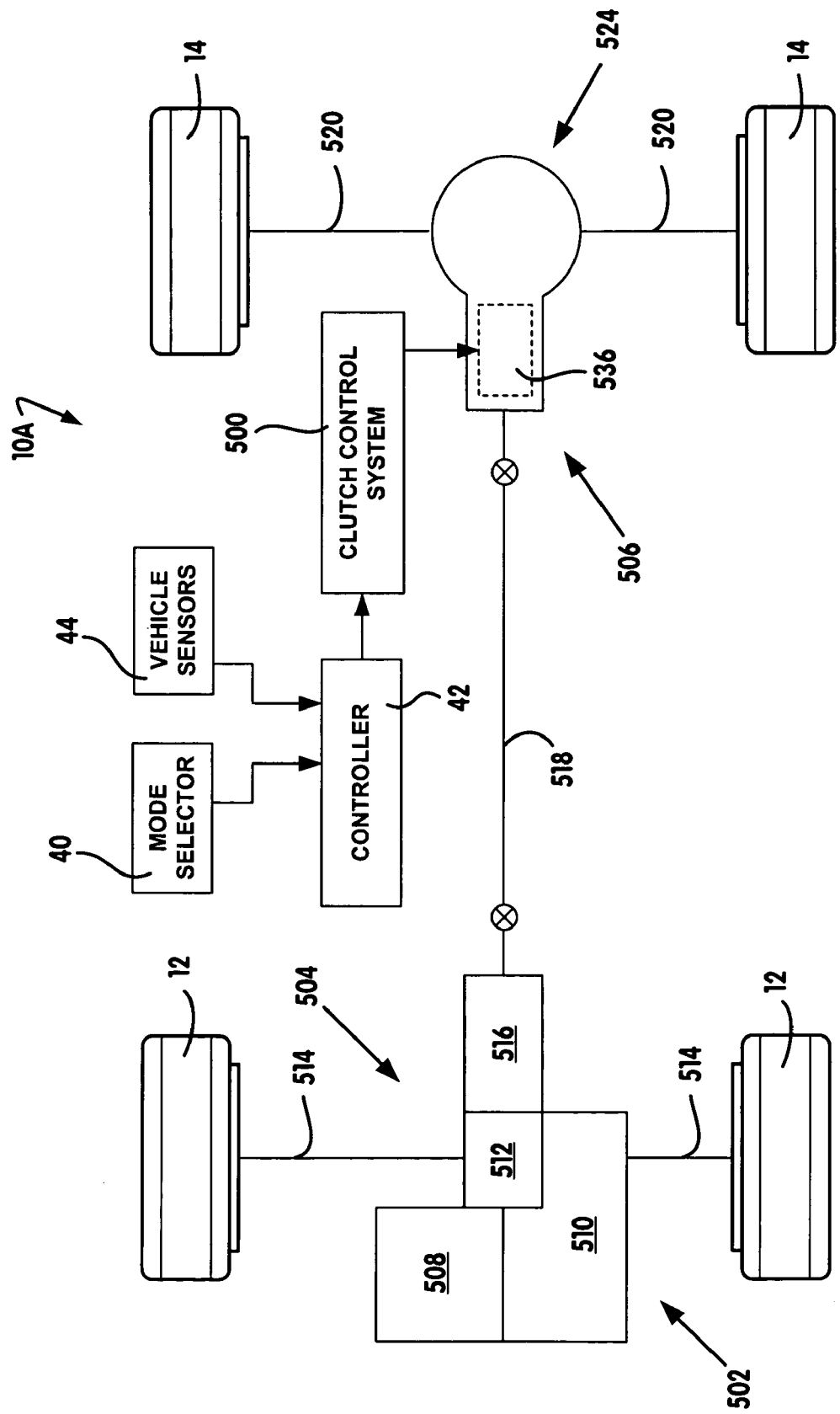
FIG. 5 is a schematic representation of an exemplary all-wheel drive vehicle equipped with a power transmission device and clutch control system of the present invention.

With reference to FIG. 5, a schematic layout of a vehicular drivetrain 10A is shown to include a powertrain 502, a first or primary driveline 504 driven by powertrain 502 and a second or secondary driveline 506. Powertrain 502 includes an engine 508 and a multi-speed transaxle 510 arranged to normally provide motive power (i.e., drive torque) to a pair of first wheels 12 associated with primary driveline 504. Primary driveline 504 further includes a pair of axleshafts 514 connecting first wheels 12 to a differential unit 512 associated with transaxle 510. Secondary driveline 506 includes a power take-off unit (PTU) 516 driven by the output of transaxle 510, a propshaft 518 driven by PTU 516, and a pair of axleshafts 520 connected to a pair of second wheels 14 associated with a drive axle assembly 524 that is operable to selectively transfer drive torque from propshaft 518 to axleshafts 520. As will be appreciated, this particular drivetrain arrangement defines a front-wheel based four-wheel or all-wheel drive vehicle. In accordance with this invention, drive axle assembly 524 functions to transfer drive torque "on-demand" to second wheels 14 in response to lost traction at first wheels 12.

Figure 6:
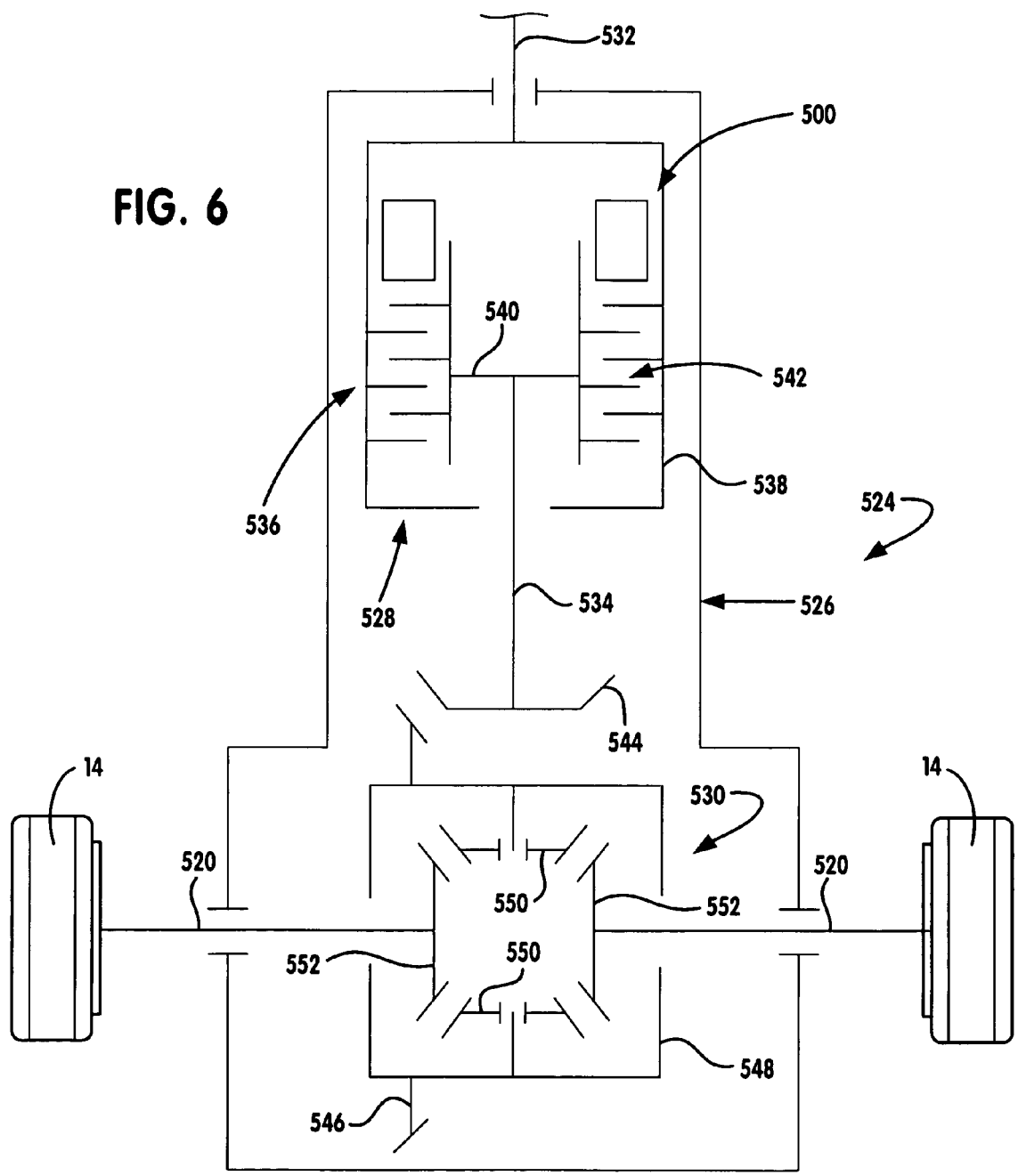
FIG. 6 is a schematic illustration of a power transmission device associated with the all-wheel drive vehicle of FIG. 5.

Referring now to FIG. 6, drive axle assembly 524 is schematically shown to include a power transmission device according to a preferred embodiment of the present invention. In particular, drive axle assembly 524 is shown to include a housing assembly 526 which encloses a torque transmission unit 528 and a differential unit 530. Torque transfer mechanism 528 functions to selectively transfer drive torque from propshaft 518 to an input component of differential unit 530. Specifically, torque transfer mechanism 528 includes an input shaft 532 driven by propshaft 518, an output shaft 534, a transfer clutch 536 operably disposed between input shaft 532 and output shaft 534, and a hydraulic clutch control system 500. In general, hydraulic clutch control system 500 is operable for generating and applying a compressive clutch engagement force on transfer clutch 536 in response to control signals from controller 42. Clutch control system 500 is shown in block format to represent any of clutch control system 200 (FIG. 2), clutch control system 300 (FIG. 3) and clutch control system 400 (FIG. 4) previously disclosed in both structure and function.

Transfer clutch 536 generally includes a first member 538 driven by input shaft 532, a second member 540 driving output shaft 534 and a multi-plate clutch pack 542 of alternately interleaved clutch plates installed between input shaft 532 and pinion shaft 534. As shown in this particular arrangement, first member 538 is a clutch drum and second member 540 is a clutch hub. Output shaft 534 is a pinion shaft having a pinion gear 544 meshed with a ring gear 546 which, in turn, drives differential unit 530. Differential unit 530 includes a differential case 548 driven by ring gear 546, a pair of pinion gears 550 rotatably supported on pinion posts fixed to case 548 and a pair of side gears 552. Each side gear 552 is meshed with both pinion gears 550 and is coupled for rotation with a corresponding one of axleshafts 520.

Figure 7:
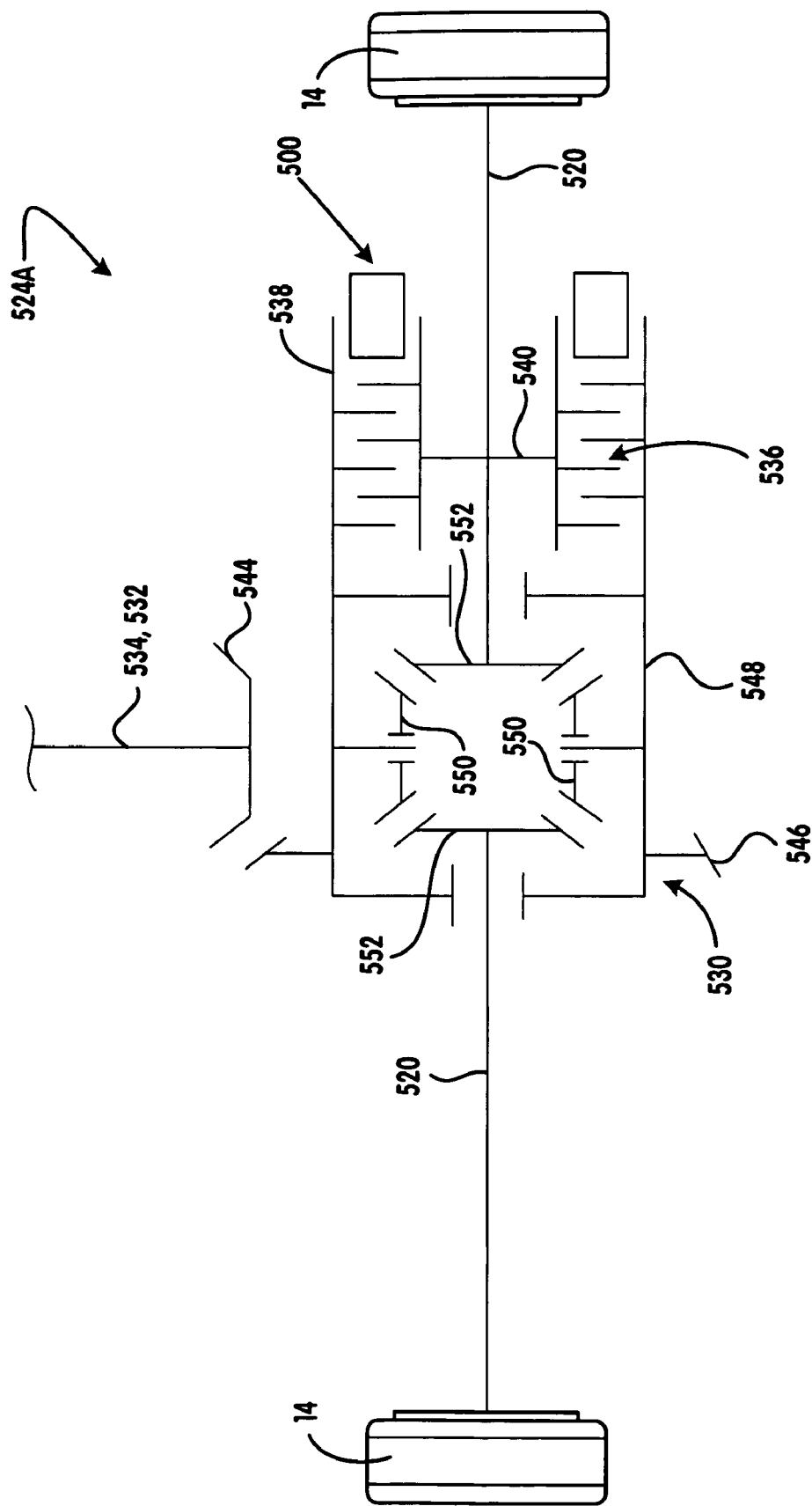
FIG. 7 is a schematic illustration of an alternative power transmission device according to the present invention.

The arrangement shown in FIG. 6 is operable to provide on-demand four-wheel drive by automatically transferring drive torque from PTU 516 to rear axle assembly 524 in response to and as a function of the occurrence of an interaxle speed difference between input shaft 532 and pinion shaft 534. In contrast, a drive axle assembly 524A is shown in FIG. 7 wherein the torque transfer mechanism is operably installed between differential case 548 and one of axleshafts 520 to provide an on-demand torque biasing and limited slip feature in response to the occurrence of an intra-axle speed difference. As before, the torque transfer mechanism is schematically shown to include transfer clutch 536 and clutch control system 500, the construction and function of which are understood to be similar to the detailed description previously provided herein for each sub-assembly. It will also be understood that this particular "limited slip" differential arrangement can either be used in association with the on-demand drive axle assembly shown in FIG. 6 or in association with a drive axle assembly wherein propshaft 518 directly drives differential unit 530.

Figure 8:
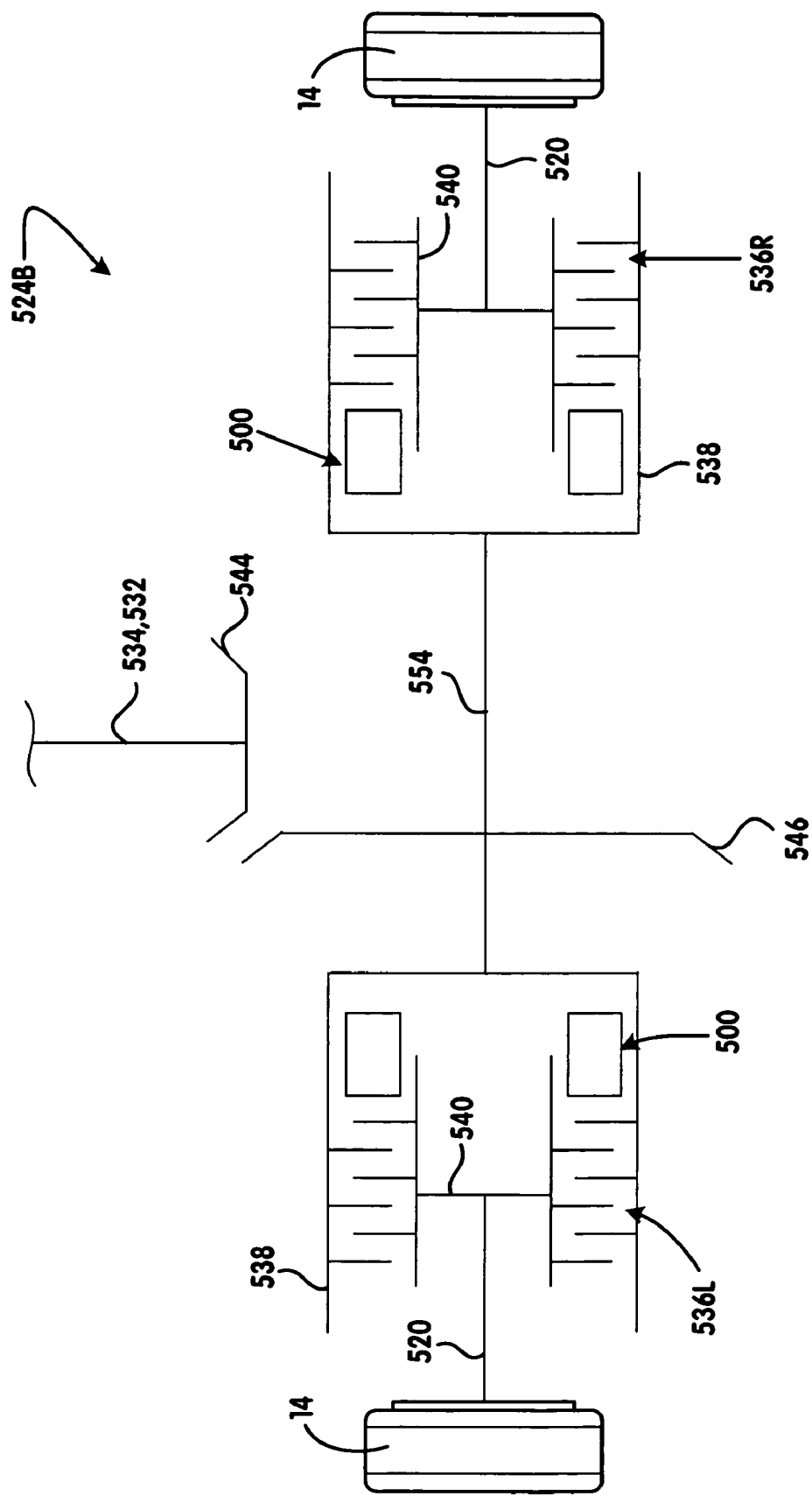
FIG. 8 is a schematic illustration of another alternative power transmission device according to the present invention.

Referring now to FIG. 8, a drive axle assembly 524B is schematically shown to include a pair of transfer clutches 536L and 536R operably installed between a driven shaft 534 or 532 and axleshafts 520. The driven pinion shaft drives a right-angled gearset including a pinion 544 and a ring gear 546 which, in turn, drives a transfer shaft 554. First transfer clutch 536L is shown disposed between transfer shaft 554 and left axleshaft 520 while second transfer clutch 536R is disposed between transfer shaft 554 and right axleshaft 520. Each transfer clutch 536L and 536R is shown to include clutch control system 500. Accordingly, independent slip control between the driven pinion shaft and each wheel 14 is provided by this arrangement.

Figure 9:
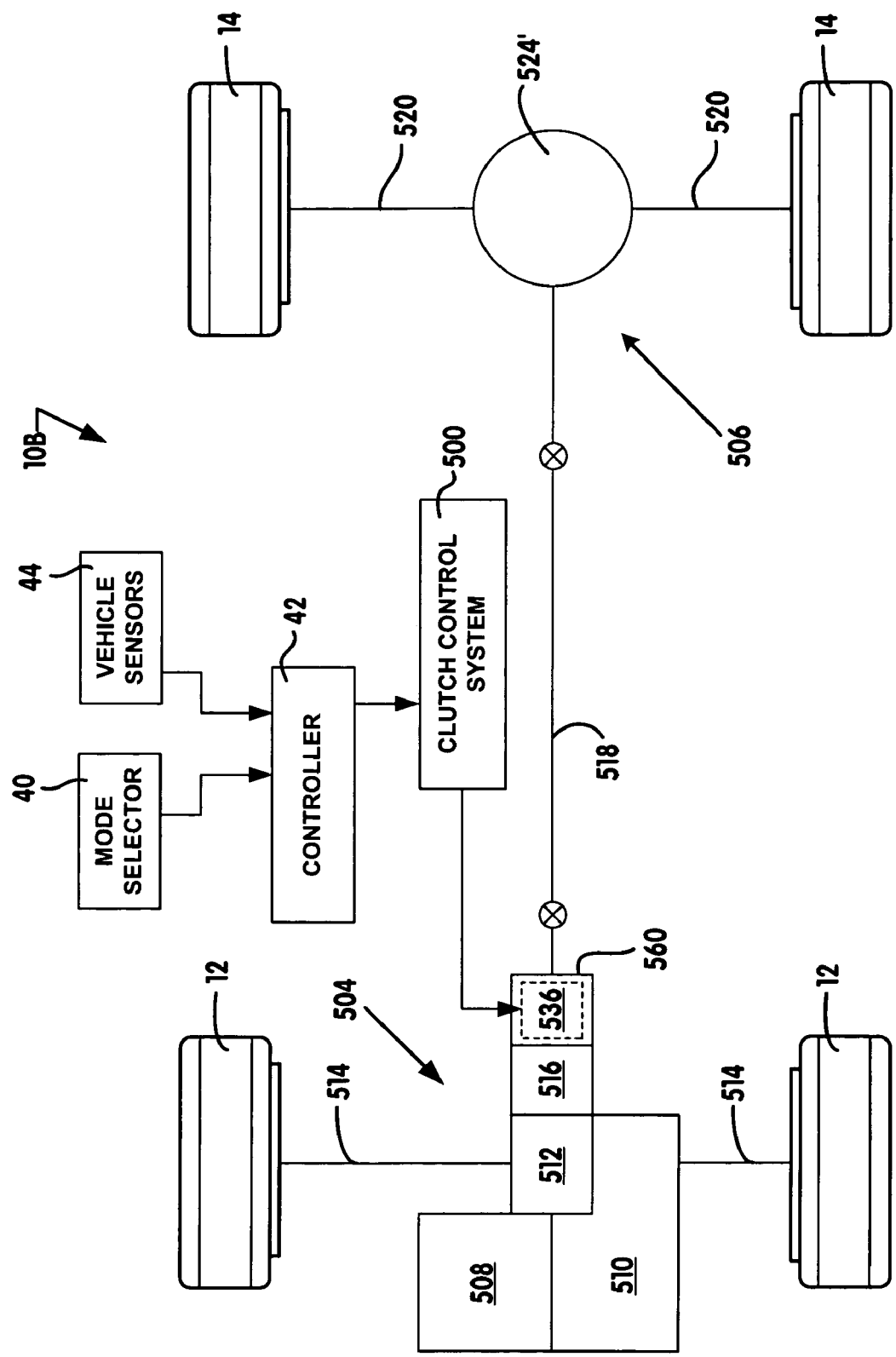
FIG. 9 illustrates an alternative drivetrain arrangement for an all-wheel drive vehicle equipped with a power transmission device and clutch control system embodying the present invention.

To illustrate an alternative power transmission device to which the present invention is applicable, FIG. 9 schematically depicts a front-wheel based four-wheel drive drivetrain layout 10B for a motor vehicle. In particular, engine 508 drives a multi-speed transaxle 510 having an integrated front differential unit 512 for driving front wheels 12 via axleshafts 514. As before, PTU 516 is also driven by transaxle 510 for delivering drive torque to the input member of a power transmission device 560. The output member of power transmission device 560 is coupled to propshaft 518 which, in turn, drives rear wheels 14 via axleshafts 520. Rear axle assembly 524' can be a traditional driven axle with differential 530 or, in the alternative, be similar to the arrangements described in relation to FIG. 6 or 7. Accordingly, in response to the occurrence of a front wheel slip condition, power transmission device 560 delivers drive torque "on-demand" to rear wheels 14. It is contemplated that power transmission device 560 would have a transfer clutch 536 and a clutch control system 500, as are schematically shown.

Figure 10:
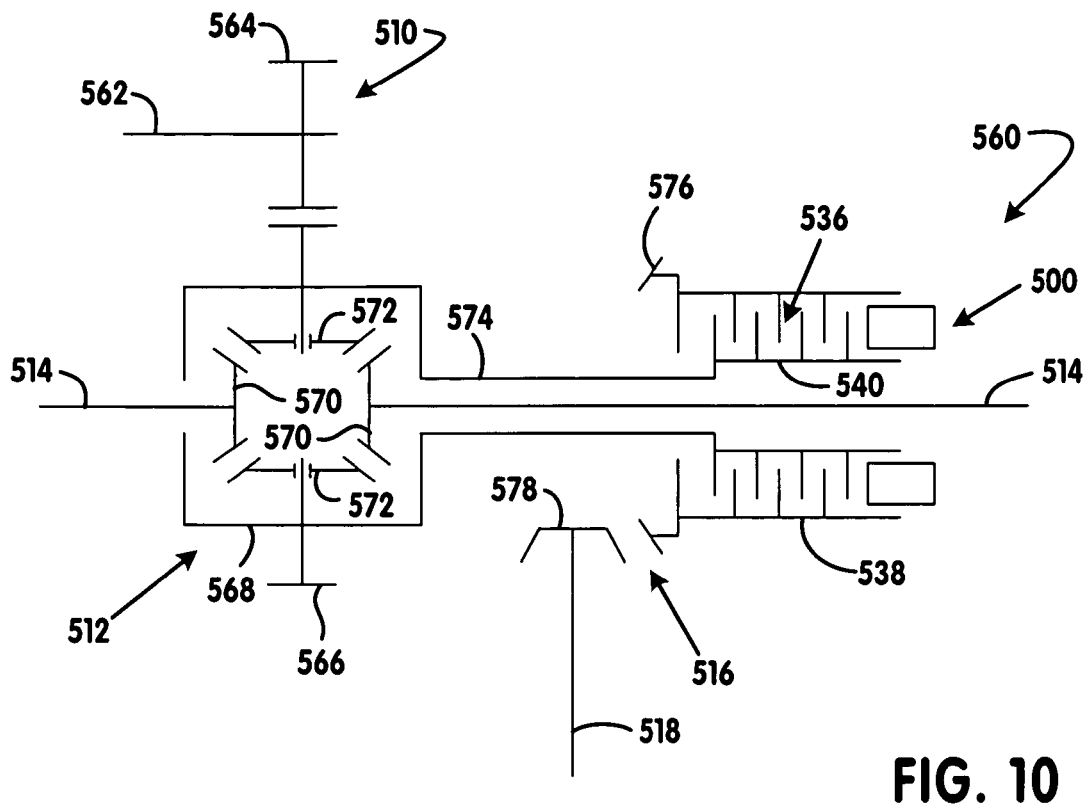
FIGS. 10 through 13 schematically illustrate different embodiments of the power transmission device shown in FIG. 9.

Referring now to FIG. 10, power transmission device 560 is schematically illustrated in association with an on-demand four-wheel drive system based on a front-wheel drive vehicle similar to that shown in FIG. 9. In particular, an output shaft 562 of transaxle 510 is shown to drive an output gear 564 which, in turn, drives an input gear 566 that is fixed to a carrier 568 associated with front differential unit 512. To provide drive torque to front wheels 12, front differential unit 512 includes a pair of side gears 570 that are connected to front wheels 12 via axleshafts 514. Differential unit 512 also includes pinions 572 that are rotatably supported on pinion shafts fixed to carrier 568 and which are meshed with side gears 570. A transfer shaft 574 is provided for transferring drive torque from carrier 568 to a clutch hub 540 associated with transfer clutch 536. PTU 516 is a right-angled drive mechanism including a ring gear 576 fixed for rotation with drum 538 of transfer clutch 536 and which is meshed with a pinion gear 578 fixed for rotation with propshaft 518. According to the present invention, the components schematically shown for the torque transfer mechanism are understood to be similar to those previously described. In operation, drive torque is transferred on-demand from the primary (i.e., front) driveline to the secondary (i.e., rear) driveline.

Figure 11:
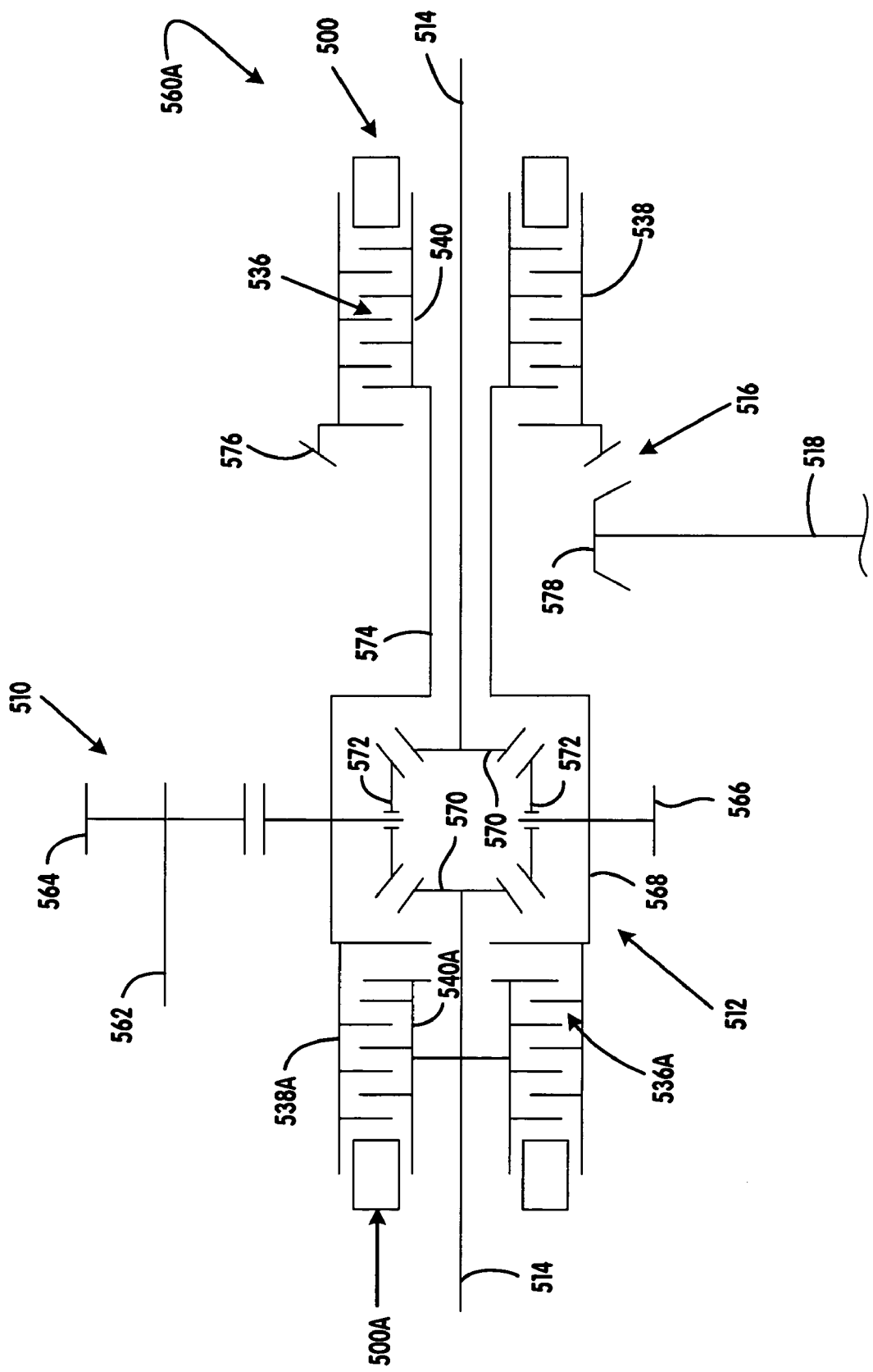

Referring to FIG. 11, a modified version of power transmission device 560 shown in FIG. 10 is identified by reference numeral 560A and includes a second transfer clutch 536A that is arranged to provide a limited slip feature in association with primary differential 512. As before, transfer clutch 536 provides on-demand transfer of drive torque from the primary driveline to the secondary driveline. In addition, second transfer clutch 536A now provides on-demand torque biasing (side-to-side) between axleshafts 514 of primary driveline 504 via actuation of a second clutch control system 500A. As will be understood, second clutch control system 500A can be an independent system or a sub-system of clutch control system 500.

Figure 12:
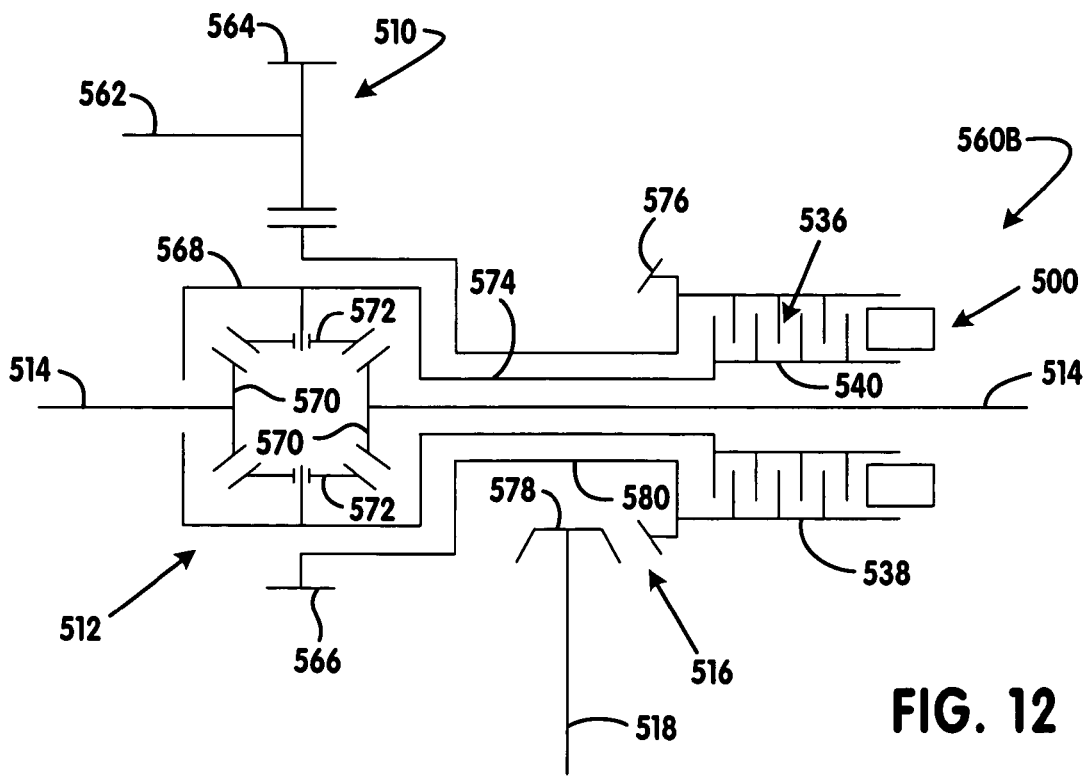

FIG. 12 illustrates another modified version of FIG. 10 wherein an on-demand four-wheel drive system is shown based on a rear-wheel drive motor vehicle that is arranged to normally deliver drive torque to rear wheels 14 while selectively transmitting drive torque to front wheels 12 through a power transmission device 560B. In this arrangement, drive torque is transmitted directly from transmission output shaft 562 to power transfer unit 516 via a drive shaft 580 which interconnects input gear 566 to ring gear 576. To provide drive torque to front wheels 12, power transmission device 560 is shown operably disposed between drive shaft 580 and transfer shaft 574. In particular, transfer clutch 536 is arranged such that drum 538 is driven with ring gear 576 by drive shaft 580. As such, clutch control system 500 functions to transfer drive torque from drum 538 through the clutch pack to hub 540 which, in turn, drives carrier 568 of differential unit 512 via transfer shaft 574.

Figure 13:
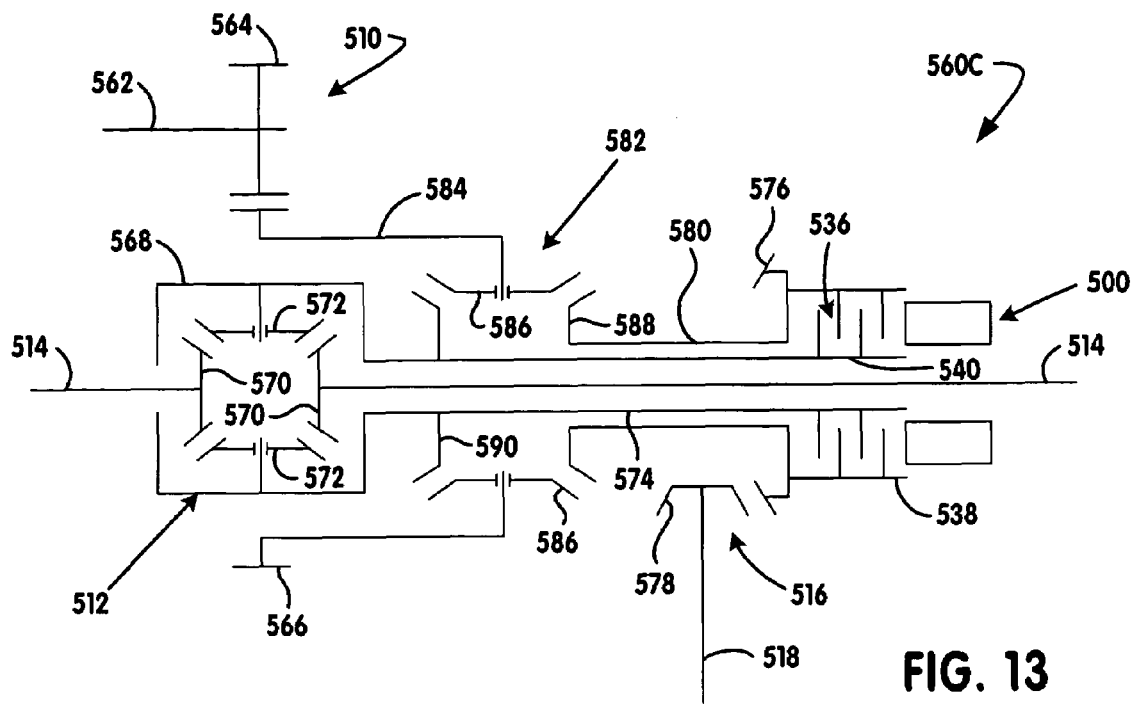

In addition to the on-demand four-wheel drive systems shown previously, the power transmission technology of the present invention can likewise be used in full-time four-wheel drive systems to adaptively bias the torque distribution transmitted by a center or "interaxle" differential unit to the front and rear drivelines. For example, FIG. 13 schematically illustrates a full-time four-wheel drive system which is generally similar to the on-demand four-wheel drive system shown in FIG. 12 with the exception that power transmission device 560C has an interaxle differential unit 582 operably installed between carrier 568 of front differential unit 512 and transfer shaft 574. In particular, output gear 566 is fixed for rotation with a carrier 584 of interaxle differential 582 from which pinion gears 586 are rotatably supported. A first side gear 588 is meshed with pinion gears 586 and is fixed for rotation with drive shaft 580 so as to be drivingly interconnected to the rear driveline through power transfer unit 516. Likewise, a second side gear 590 is meshed with pinion gears 586 and is fixed for rotation with carrier 568 of front differential unit 512 so as to be drivingly interconnected to the front driveline. Transfer clutch 536 is shown to be operably disposed between side gears 588 and 590 for providing an adaptive torque biasing and slip limiting function.

Figure 14:
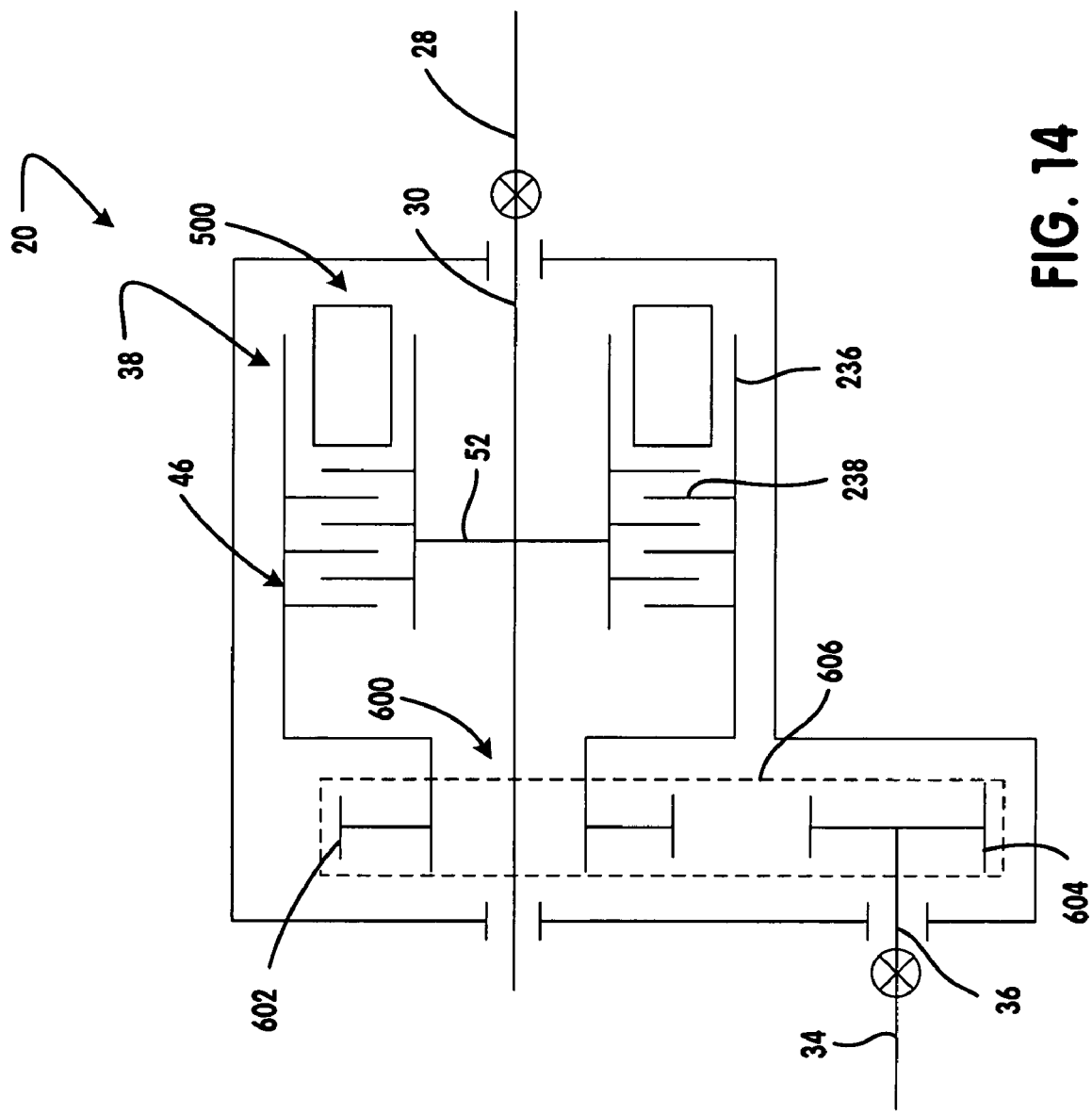

Referring to FIG. 14, transfer case 20 from FIG. 1 is shown schematically to have rear output shaft 30 adapted for connection between the output of transmission 18 and propshaft 28. A transfer assembly 600 includes a first sprocket 602 rotatably supported on rear output shaft 30, a second sprocket 604 fixed to front output shaft 36 and a power chain 606 meshed therebetween. As noted, actuation of transfer clutch 38 via clutch control system 500 controls adaptive transfer of drive torque from rear output shaft 20 to front output shaft 36.

Figure 15:
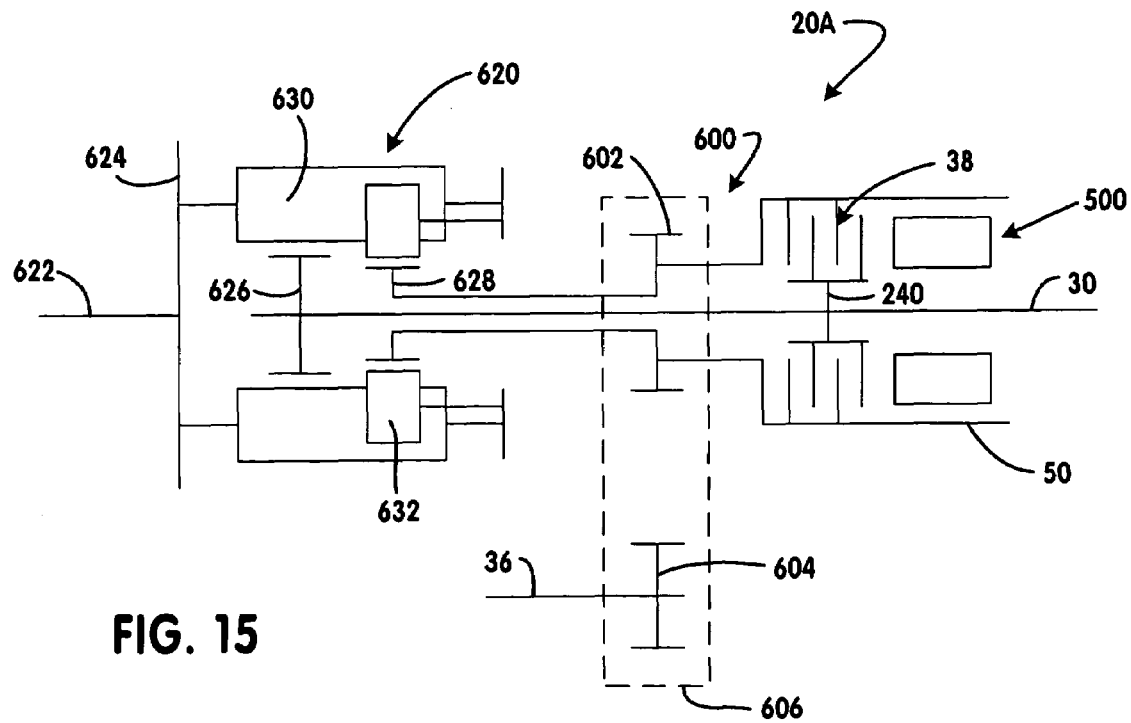
FIGS. 14 and 15 are schematic illustrations of the transfer case shown in FIG. 1.

Referring to FIG. 15, a transfer case 20A is shown which is generally similar to transfer case 20 of FIG. 14 except that an interaxle differential 620 is provided between an input shaft 622 and output shafts 30 and 36. Input shaft 622 is driven by the output of transmission 18. Differential 620 includes an input defined as a planet carrier 624, a first output defined as a first sun gear 626, a second output defined as a second sun gear 628 and a gearset for permitting speed differentiation between first and second sun gears 626 and 628. The gearset includes a plurality of meshed pairs of first planet gears 630 and second pinions 632 which are rotatably supported by carrier 624. First planet gears 630 are shown to mesh with first sun gear 626 while second planet gears 632 are meshed with second sun gear 625. First sun gear 626 is fixed for rotation with rear output shaft 30 so as to transmit drive torque to the rear driveline. To transmit drive torque to the front driveline, second sun gear 628 is coupled to transfer assembly 600 which again includes first sprocket 602 rotatably supported on rear output shaft 30, second sprocket 604 fixed to front output shaft 36 and power chain 306.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A power transmission device, comprising:
   a first rotary member;
   a second rotary member;
   a friction clutch operably disposed between said first and second rotary members;
   a hydraulic clutch actuation system for generating and applying a clutch engagement force to said friction clutch, said hydraulic clutch actuation system including a hydraulic actuator in fluid communication with a clutch actuator, an accumulator operable to store pressurized fluid supplied by said hydraulic actuator and a control valve for controlling delivery of pressurized fluid from said accumulator to said clutch actuator, said hydraulic actuator including a first piston disposed in a first chamber and an electromagnetic operator energizable to control movement of said first piston in said first chamber, and said clutch actuator includes a second piston disposed in a second chamber to apply said clutch engagement force to said friction clutch, said hydraulic clutch actuation system further including a second control valve operable for selectively controlling the delivery of fluid from said second chamber to said first chamber; and
   a control system for controlling energization of said electromagnetic operator and said control valve.

2. The power transmission device of claim 1 wherein said hydraulic clutch actuation system further includes a second accumulator operably disposed between said second control valve and said first chamber.

3. The power transmission device of claim 1 wherein said hydraulic clutch actuation system is a closed system with said first control valve disposed in a supply line between said first and second chambers and said second control valve disposed in a return line between said first and second chambers.

4. The power transmission device of claim 1 wherein said first rotary member is a first shaft providing drive torque from a powertrain to a first driveline of a motor vehicle, wherein said second rotary member is a second shaft that is coupled to a second driveline of the motor vehicle, and wherein engagement of said friction clutch results in transfer of drive torque from said first shaft to said second shaft.

5. The power transmission device of claim 4 defining a transfer case wherein said first shaft is a rear output shaft driving a rear driveline, said second shaft is a front output shaft driving a front driveline, and wherein engagement of said friction clutch is operable to transfer drive torque from said rear output shaft to said front output shaft.

6. A power transmission device, comprising:
a first rotary member;
a second rotary member;
a torque transfer mechanism operable for transferring drive torque from said first rotary member to said second rotary member, said torque transfer mechanism including a friction clutch operably disposed between said first and second rotary members and a hydraulic clutch actuation system operable for applying a clutch engagement force to said friction clutch, said hydraulic clutch actuation system including an electromagnetic actuator operable to translate a piston from a retracted position to an advanced position, an accumulator for storing pressurized fluid supplied by said electromagnetic actuator, said piston being operable to supply pressurized fluid to said accumulator for actuation of said friction clutch, and a delivery system for selectively providing pressurized fluid from said accumulator to a second piston operable to provide said clutch engagement force, wherein said hydraulic clutch actuation system includes a first control valve for selectively fluidly coupling said accumulator to said second piston; and
a control system for controlling actuation of said electromagnetic actuator.

7. The power transmission device of claim 6 wherein said hydraulic clutch actuation system further includes a second control valve for selectively coupling a pressure chamber containing said second piston with a second accumulator, said second control valve being operable to release pressure in said pressure chamber for reducing said clutch engagement force applied to said friction clutch.

8. The power transmission device of claim 7 wherein said control system includes a controller and a pressure sensor operable to provide said controller with a signal indicative of a fluid pressure within said pressure chamber.

9. The power transmission device of claim 6 wherein said hydraulic clutch actuation system further includes a second control valve operable for selectively controlling the delivery of fluid from said second piston to said first piston.

10. The power transmission device of claim 9 wherein said hydraulic clutch actuation system further includes a second accumulator operably disposed between said second control valve and said first piston.

11. The power transmission device of claim 9 wherein said hydraulic clutch actuation system is a closed system with said first control valve disposed in a supply line between said first and second pistons and said second control valve disposed in a return line between said first and second pistons.

12. The power transmission device of claim 6 wherein said first rotary member is a first shaft providing drive torque from a powertrain to a first driveline of a motor vehicle, wherein said second rotary member is a second shaft that is coupled to a second driveline of the motor vehicle, and wherein engagement of said friction clutch results in transfer of drive torque from said first shaft to said second shaft.

13. The power transmission device of claim 12 defining a transfer case wherein said first shaft is a rear output shaft driving a rear driveline, said second shaft is a front output shaft driving a front driveline and said friction clutch is engaged to transfer drive torque from said rear output shaft to said front output shaft.

14. A transfer case for a motor vehicle having a powertrain and first and second drivelines, comprising:
a first rotary member adapted to transfer drive torque from the powertrain to the first driveline;
a second rotary member adapted to provide drive torque to the second driveline; and
a torque transfer mechanism including a friction clutch operably disposed between said first and second rotary members and a hydraulic clutch actuation system operable for engaging said friction clutch to transfer drive torque from said first rotary member to said second rotary member, said hydraulic clutch actuation system including a hydraulic actuator, an accumulator, a clutch actuator and a control system, said hydraulic actuator having a first piston disposed in a first pressure chamber and an electromagnet for controlling movement of said first piston to supply pressurized fluid from said first pressure chamber to said accumulator, said clutch actuator having a second piston disposed in a second pressure chamber and operable to apply a clutch engagement force on said friction clutch, and said control system includes a control valve for controlling the delivery of pressurized fluid from said accumulator to said second pressure chamber and a controller for controlling actuation of said electromagnet and said control valve.

15. The transfer case of claim 14 wherein said control system of said hydraulic clutch actuation system further includes a second control valve for controlling the delivery of pressurized fluid from said second pressure chamber to a second accumulator, and wherein said controller is operable to control actuation of said second control valve.

16. The transfer case of claim 15 wherein said hydraulic clutch actuation system further includes a first pressure sensor operable for providing said controller with a first pressure signal indicative of the fluid pressure in said first accumulator and a second pressure sensor operable for providing said controller with a second pressure signal indicative of the fluid pressure in said second pressure chamber.

17. The transfer case of claim 14 wherein said controller is operable to control actuation of said electromagnet to move said first piston within said first pressure chamber between first and second positions to maintain said fluid pressure within said accumulator within a desired range.

18. The transfer case of claim 14 wherein said hydraulic clutch actuation system is a closed hydraulic system having a supply line and a return line between said first and second pressure chambers.

* * * * *